Figure 1:
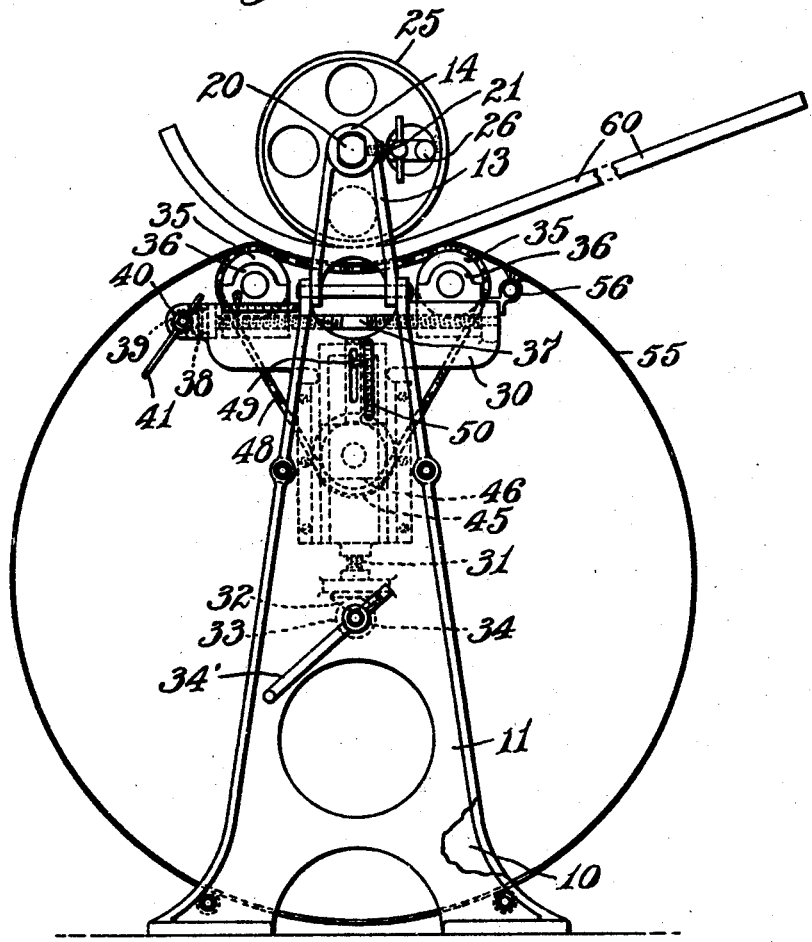

June 24, 1930.  C. H. STRUPE  1,766,963
BENDING MACHINE
Filed July 13, 1928   2 Sheets-Sheet 1

INVENTOR.
Cecil H. Strupe,
BY
Hood & Hahn.
ATTORNEYS

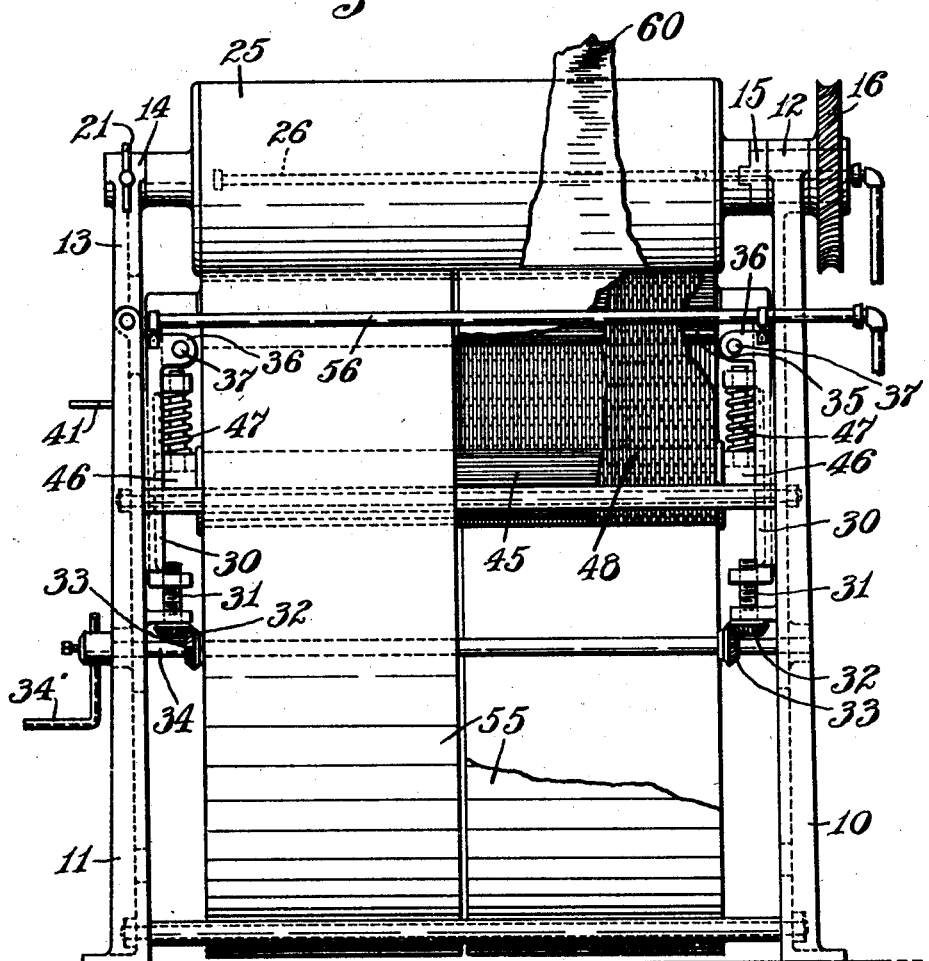

Patented June 24, 1930

1,766,963

UNITED STATES PATENT OFFICE

CECIL H. STRUPE, OF INDIANAPOLIS, INDIANA

BENDING MACHINE

Application filed July 13, 1928. Serial No. 292,439.

The object of my invention is to produce an improved machine for bending wood into desired arcs, the construction being such that, in many cases, as, for instance, drum bodies, chair parts, etc., a desired permanency of set may be obtained without previously steaming or heating the wood.

The accompanying drawings illustrate my invention.

Fig. 1 is an end elevation of a machine embodying my improvements, and

Fig. 2, a side elevation, with a portion of the endless apron broken away.

In the drawings 10 and 11 indicate end members of a main frame. Member 10 is provided, at its upper end, with a shaft bearing 12, and member 11 is supplemented at its upper end by a hinged bracket 13 provided at its free end with a socket 14 which may be brought into alinement with bearing 12. Journalled in bearing 12 is a sleeve 15 the outer end of which carries a gear 16.

Passing through sleeve 15 and into socket 14 is a fixed shaft 20 engaged by a retaining screw 21 carried by bracket 13.

Sleeved upon shaft 15 is a bending roller or drum 25 which interlocks with sleeve 15 so as to be driven thereby.

Drum 25 is preferably hollow and arranged within it parallel with its axis is an elongated gas burner 26 by means of which the roller may be heated if desired, said burner being connected to a suitable supply bore formed in shaft 20.

Arranged below drum 25, in suitable guides in side members 10 and 11, is a vertically movable carriage 30 which may be vertically adjusted by means of screws 31, 31, gears 32, 32, 33, 33, shaft 34 and hand crank 34'. Journalled in carriage 30, on axes parallel with the axis of drum 25, and on opposite sides of the medial vertical plane of the drum, are two backing rollers 35, 35 which are journalled, at each end in boxes 36 mounted in suitable transverse guides in carriage 30. Boxes 36 at each end of rollers 35 are connected by a screw shaft 37 the ends of which are oppositely threaded into said boxes. Shafts 37 are connected by gears 38 and 39 with a shaft 40 journalled on carriage 30 and provided with a hand crank 41 so that the two rollers may be simultaneously adjusted laterally toward or from the medial vertical plane of drum 25.

Arranged below rollers 35, 35, in the medial plane of the machine, is a roller 45 journalled at its ends in blocks 46 vertically slidable in guides in carriage 30 and urged downwardly by springs 47. Encompassing rollers 35, 35 and 45 is an endless pressure belt 48 conveniently formed of a plurality of circumferential series of pivotally connected links. In order to indicate the position of carriage 30 at any time I provide a pointer 49 carried by the carriage and traversing a scale 50.

In order to prevent any marring of the articles being bent I provide an endless smooth metal band 55 conveniently of spring steel which therefore always lies between the work and belt 48. A burner 56 may be arranged on carriage 30 at the entrance side of the machine and so as to project a flame upon band 55 just before it engages the work.

In operation carriage 30 and rollers 45 are so adjusted relative to drum 25 as to obtain the proper and desired action of band 55 on the work 60 as it is drawn through the machine by the force applied to rotate drum 25.

The spacing of rollers 45, 45 from each other and the spacing of carriage 30 from drum 25, in conjunction with the thickness of material to be operated upon, will determine the curvature to which the material will be bent as it passes through the machine and these adjustments will vary with the material to be operated upon and the capability of the machine for these adjustments is an important element of my invention because any desired arc of contact of the backing band under any desired spring pressure may be obtained.

I claim as my invention.

1. A bending machine comprising a bending drum, a pair of backing rollers laterally spaced on opposite sides of the axis of the drum, a carriage supporting said rollers, means by which the space between said backing rollers may be varied, means by which the carriage may be adjusted toward and from the axis of the drum whereby the distance between the axis of the drum and the plane of the backing roller axes may be varied and a shiftable backing element arranged between the drum and backing rollers.

2. A bending machine comprising a bending drum, a pair of backing rollers associated therewith, a third roller grouped with the backing rollers, a carriage supporting said rollers, an endless belt encompassing the backing rollers and the third roller, means yieldingly tensioning said belt, means by which the distance between the backing rollers may be adjusted and means by which the carriage may be adjusted toward and from the axis of the drum, whereby the distance between the axis of the drum and the plane of the axes of the backing rollers may be adjusted.

3. A machine of the character defined in claim 2 wherein a resilient endless band is interposed between the drum and belt and encompasses said belt.

4. A bending machine comprising a bending drum, a pair of backing rollers parallel with said drum, a carriage supporting said rollers, means by which said carriage may be adjusted toward and from the axis of the drum, means by which the backing rollers may be adjusted toward and from each other, an idler roller mounted on said carriage, a spring backing for said idler roller, and an endless belt encompassing said backing rollers and idler roller.

5. A bending machine comprising a bending drum, a pair of backing rollers parallel with said drum, a carriage suporting said rollers, means by which said carriage may be adjusted toward and from the axis of the drum, means by which the backing rollers may be adjusted toward and from each other, an idler roller mounted on said carriage, a spring backing for said idler roller, an endless belt encompassing said backing rollers and idler roller, and a resilient metal strip interposed between the drum and endless belt.

In witness whereof I, CECIL H. STRUPE, have hereunto set my hand at Indianapolis, Indiana, this 3rd day of July, A. D. one thousand nine hundred and twenty-eight.

CECIL H. STRUPE.